United States Patent [19]
Taneda et al.

[11] 4,087,651
[45] May 2, 1978

[54] OPTICAL SOUND RECORDING SYSTEM WITH INVERSELY POLARIZED SOUND SIGNALS

[75] Inventors: Teiichi Taneda, Kawasaki; Yukio Sugiura, Tokyo; Toshio Motoki, Yamato; Hiroyuki Miyatera, Yokosuka; Goichi Oishi, Yokohama, all of Japan

[73] Assignees: Nippon Hoso Kyokai, Tokyo; Yokohama Cinema Laboratories Inc., Yokohama, both of Japan

[21] Appl. No.: 770,652

[22] Filed: Feb. 22, 1977

[30] Foreign Application Priority Data

Feb. 24, 1976    Japan ................................. 51-19256

[51] Int. Cl.$^2$ ........................... H04N 5/84; G11B 7/02
[52] U.S. Cl. .............................. 179/100.3 R; 358/132; 179/100.3 A
[58] Field of Search ................ 179/100.3 R, 100.3 G; 352/27, 29; 358/132

[56] References Cited

U.S. PATENT DOCUMENTS

| 3,335,219 | 8/1967 | Goldmark et al. | 179/100.3 A |
| 3,819,874 | 6/1974 | Fujio | 358/132 X |
| 3,854,005 | 12/1974 | Castrignano | 358/132 |

Primary Examiner—John H. Wolff
Attorney, Agent, or Firm—Stevens, Davis, Miller & Mosher

[57] ABSTRACT

An optical sound recording system of modified variable area type, wherein a light beam, preferably a laser beam, is pulse-width modulated in response to sound signals and deflected at a high frequency beyond audible range and then recorded on a sound track of cinema film. The pulse-width modulation of the light beam is performed in such a manner that a carrier wave having the same frequency, phase, and wave form to those of the deflection of the light beam and being clipped on both sides of amplitude by a pair of sound signals polarized inversely with each other and biased positively and negatively is used for gating the light beam. Consequently a high quality optical sound recording system unrelated to the carrier waveform used for the pulse-width modulation can be realized.

17 Claims, 7 Drawing Figures

OPTICAL SOUND RECORDING SYSTEM WITH INVERSELY POLARIZED SOUND SIGNALS

BACKGROUND OF THE INVENTION (1) Field of the Invention

The present invention relates to an optical sound recording system of modified variable area type used for recording sound signals on a cinema film and others for which it is required strictly to reduce distortion of recorded sound signals.

(2) Description of the Prior Art

In conventional optical sound recording systems, as shown, for instance, in the Focal Encyclopedia of the Film and Television Techniques: Focal Press, London and New York, 1969, pp. 700–703, a triangular light image formed by throwing a light of an incandescent lamp on a triangular window provided on a mask is reflected by a mirror of a galvanometer and then focused on a slit provided on another mask, so that rectilineal light images having various lengths corresponding to rotation angles of the mirror of the galvanometer which is driven by sound signals can be derived from the slit. Consequently, rectilineal light images having various length corresponding to sound signals can be projected on a film transported continuously, so as to perform sound recording of variable area type.

However, in the optical sound recording system mentioned above, the galvanometer provided with the considerably weighty mirror rotating in response to applied signals is used for modulating the light projected on the film, so that it is difficult to obtain an optical pattern recorded on the film exactly in response to sound signals of sufficiently wide frequency range.

Furthermore, in the optical sound recording system mentioned above, it is difficult to obtain the triangular light image having sufficient intensity and uniformity of brightness, even if a laser beam source is used as a light source, so that the brightness of rectilineal light images is varied in accordance with their length, and consequently the conventional optical sound recording of variable area type mentioned above is fairly inferior with respect to quality of recorded sound signals in comparison with that of a magnetic sound recording system.

By the way, in a conventional optical sound recording system of variable density type is further inferior with respect to noise and distortion of recorded sound signals in comparison with those of variable area type.

Accordingly, in case the quality of sound signals recorded on a cinema film is attached with special importance, the magnetic sound recording system is used hitherto. However, with recording sound signals magnetically on a cinema film, many other troublesome matters are met. The first of these matters is that excessive cost is required for coating a magnetic sound track on a cinema film. The second of these matters is that the base film on which a magnetic layer is disposed is fairly thicker than that of a magnetic tape used exclusively for recording sound signals, so that a magnetic head cannot be attached sufficiently to the magnetic layer deposited on the film transported continuously. Accordingly, in the magnetic sound recording system used for the cinema film, high pressure is applied between the magnetic head and the magnetic layer, so that magnetic powders plucked off from the magnetic layer are apt to close a gap of the magnetic head. The third of those matters is that a fairly heavy frictional load of a film transporting mechanism applied with the high pressure mentioned above is apt to cause uneven speed on transport of the film, so that wow and flutter are apt to occur. The fourth of those matters is that a lifetime is shortened owing to the high pressure mentioned above, so that the increase of running cost, especially for a cinema film of 70 mm width type, cannot be neglected. The last of those matters is that magnetic patterns recorded on the film are fairly unstable in comparison with the optical pattern recorded on the film, so that the sound signals recorded magnetically on the film are in danger of being vanished by a strong magnetic field applied externally.

On the contrary, the optical sound recording system according to the present invention does not at all meet the troublesome matters mentioned above concerning the magnetic sound recording system used for the cinema film, and is possessed of essential superiority, so that an extreme worth in practical use can be obtained by the present optical sound recording system in case the inferiority of quality as mentioned earlier can be removed.

On the other hand, it is taken into consideration hitherto for improving the quality mentioned above concerning the optical sound recording system of variable area type to apply a pulse-width modulation used for other technical fields, for instance, an electron beam recording. However, any practical configuration of equipments wherein a pulse-width modulation system being preferable for recording sound signals optically can be realized is not yet known at all.

SUMMARY OF THE INVENTION

An object of the present invention is to solve the problem mentioned above concerning the optical sound recording system of variable area type by applying the pulse-width modulation to it.

Another object of the present invention is to realize an optical sound recording system of variable area type wherein high quality sound recording and reproducing can be performed.

In an optical sound recording system according to the present invention, a light beam, preferably a laser beam, which is deflected in one direction at a high speed, is used as a light source for recording sound signals optically, and is gated under the control of sound signals, so that sound recording of variable area type can be performed on a film transported continuously.

The optical sound recording system according to the present invention is characterized in that said system comprises a gating means provided for gating the light beam at intervals corresponding to a predetermined frequency being higher than that of sound signals to be recorded for time durations corresponding to momentary amplitudes of the sound signals, and a deflecting means provided for deflecting the gated light beam at least in one direction at the above described intervals, and sound recording on a film transported continuously can be effected in such a manner that the light beam gated by said gating means in response to the momentary amplitudes of the sound signals to be recorded, is deflected by said deflecting means at least in a direction crossing that of transporting the film and is projected on the film.

DESCRIPTION OF THE PREFERRED EMBODIMENTS

The present invention is explained in detail in reference to the drawings as follows.

Figure 1:
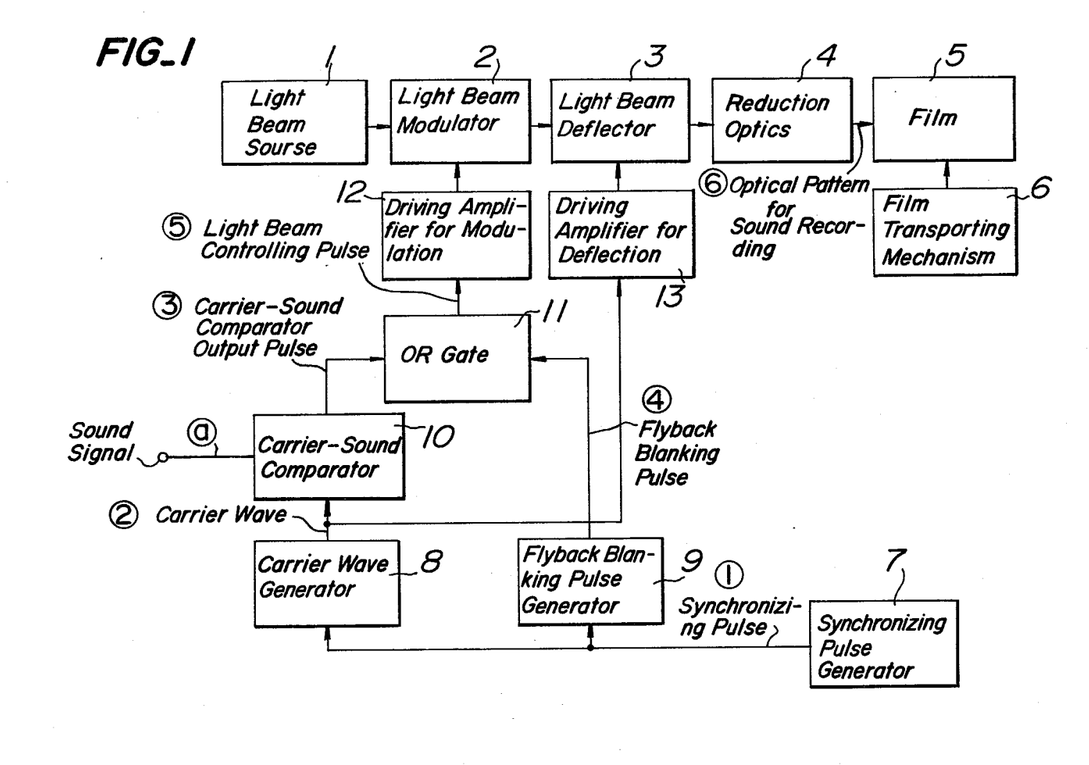
FIG. 1 is a block diagram showing a basic configuration of an optical sound recording appratus according to the present invention.

At first, a basic principle of the present invention is explained in reference to FIG. 1 showing a basic configuration of an optical sound recording system according to the present invention.

In the configuration shown in FIG. 1, a light beam derived from a light source 1, preferably a laser beam source, is gated in a light beam modulator 2 in response to sound signals to be recorded, and then is deflected in one direction by a light beam deflector 3. The gated and deflected light beam derived from the light beam deflector 3 is reduced to spot size in accordance with a width of a sound track formed on a film 5 by a reduction optics 4 consisting, for instance, of a combination of lenses, and then is projected on an emulsion layer deposited on the film 5 transported continuously by a transporting mechanism 6 and exposes the emulsion layer.

Figure 2:
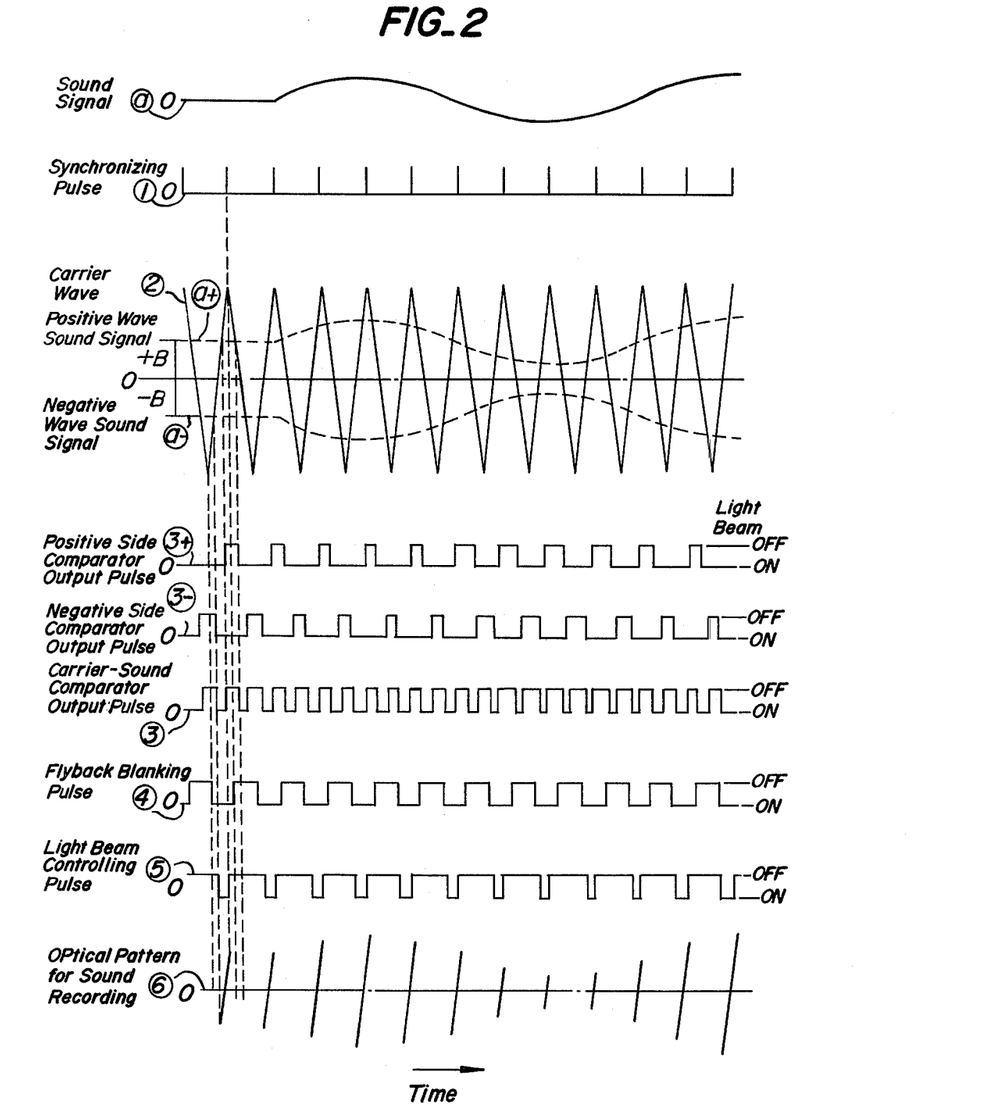
FIG. 2 is a diagram showing wave forms of signals on respective parts of the configuration shown in FIG. 1.

In the next place, manners of gating and deflecting the light beam in the light beam modulator 2 and the light beam deflector 3 are explained respectively in reference to wave forms of respective signals shown in FIG. 2.

A synchronizing pulse generator 7 consisting in the configuration shown in FIG. 1 generates a synchronizing pulse train ① used for controlling simultaneously both of the light beam modulator 2 and the light beam deflector 3. It is preferable for this synchronizing pulse train ① to consist of a pulse train having a predetermined interval corresponding to a predetermined high frequency of twice or more than the highest audible frequency contained in the sound signals to be recorded, that is, of 30 kHz or more. The synchronizing pulse train ① is applied to a carrier wave generator 8 and a flyback blanking pulse generator 9. In the carrier wave generator 8, a carrier wave ② having any one of triangular, saw-tooth and sinusoidal wave forms and being synchronized to the synchronizing pulse ① derived from the generator 7 is generated. The carrier wave ② having, for instance, the triangular wave form is applied both to a carrier-sound comparator 10 and a driving amplifier 13 for deflection. In the carrier-sound comparator 10, a positive wave sound signal (a+) having a wave form similar to the sound singnal to be recorded and being polarized in such a manner that the signal (a+) is always positive even if the sound signal has any high peak and a negative wave sound signal (a-) having an inverted and negatively polarized wave form being symmetric to that of the signal (a+) are formed, and besides these signals (a+) and (a-) are biased respectively to such adequate levels that a peak to peak value of a signal consisting of a combination of those signals (a+) and (a-) is always smaller than that of the carrier wave ② and then it is effected to compare respective signal levels between those signals (a+), (a-) and the carrier wave ②. As results of the above-mentioned comparison of signal levels, a positive side comparator output pulse ③+ corresponding to a duration wherein the signal level of the carrier wave ② is higher than that of the signal (a+) and a negative side comparator output pulse ③- corresponding to a duration wherein the signal level of the carrier wave ② is lower than that of the signal (a-) are formed respectively. These output pulses ③+ and ③- are mixed non-additively with each other, so that a carrier-sound comparator output pulse ③ consisting of a positive pulse train, which has respective pulse widths corresponding to momentary amplitudes of the sound signal to be recorded.

The above-mentioned positive pulse train ③ and a flyback blanking pulse train ④ generated in a generator 9 driven by the synchronizing pulse train ① derived from the generator 7 are applied to an OR gate 11. The flyback blanking pulse train ④ is formed in such a state that the positive pulse width corresponds to a flyback duration of the carrier wave ② having, for instance, a triangular wave form, so that a light beam controlling pulse ⑤ consisting of positive pulses which have respective pulse widths corresponding to durations wherein signal levels of either one of the carrier-sound comparator output pulse ③ and the flyback blanking pulse train ④ are positive can be derived from the OR gate 11. This light beam controlling pulse ⑤ is amplified by a driving amplifier 12 onto necessary levels, and then is applied to the light beam modulator 2, so as to drive it in such a manner that, whenever the levels of the amplified pulse ⑤ is positive, the light beam is blanked intermittently in the light beam modulators 2.

As mentioned above, only in respective durations corresponding to the respective parts of the carrier wave 2 which are clipped between the positive and the negative wave sound signals (a+) and (a-), the light beam can pass through the light beam modulator 2, so that the light beam gated in response to the sound signal can be derived from the light beam modulator 2. Furthermore, in the flyback duration of the carrier wave ②, even if the level of the carrier wave ② is settled within a range clipped between the signals (a+) and (a-), the light beam cannot pass through the light beam modulator 2, because the levels of the flyback blanking pulse train ④ and accordingly of the light beam controlling pulse ⑤ derived from the OR gate 11 become positive in the flyback duration.

The light beam gated as mentioned above is applied to a light beam deflector 3, which is driven by the carrier wave ② derived from the generator 8 and amplified onto necessary levels in a driving amplifier 13, so that the light beam derived from the light beam deflector 3 is gated at the interval corresponding to the synchronizing pulse train ① for the respective durations corresponding to the momentary amplitudes of the sound signal (a) and is deflected linearly at the interval corresponding to the synchronizing pulse train ①, similarly as shown by the pattern ⑥ in FIG. 2.

In the configuration mentioned above, the same carrier wave ② derived from the generator 8 is applied commonly to both of the light beam modulator 2 and the light beam deflector 3. Accordingly, even if the linearity of the deflection of the light beam is injured because of inferior linearity of the carrier wave ② and then the deflection speed of the light beam is, for instance, lowered, the duration wherein the light beam can pass through the light beam modulator 2 is elongated in inverse proportion to the lowered speed of the deflection, so that the deflection angle of the light beam derived from the light beam deflector 3 is exactly proportional to the momentary amplitude of the sound signal ⓐ compared with the carrier wave ② in the comparator 10, and consequently the distortion of the recorded optical pattern corresponding to the sound signal ⓐ does not at all occur in spite of the inferior linearity of the carrier wave ② used for both of light beam modulation and light beam deflection.

The light beam gated and deflected as mentioned above is applied to a reduction optics 4, wherein the beam size is reduced in response to the width of the sound track provided on the film 5, and then is projected on the sound track. So that, the sound track of the film 5 transported continuously is exposed by the gated and deflected light beam, and consequently the optical pattern similar to the pattern ⑥ shown in FIG. 2 is formed. In the pattern ⑥ of FIG. 2, fairly wide gaps are shown between respective sectional loci of the gated and deflected light beam in relation to the wave forms ② to ⑤. However, in practice, those gaps shown in the recorded pattern ⑥ can be reduced extremely by means of settling adequately the running speed of the film 5 and the intervals of the synchronizing pulse train ①. Moreover, even if such an optical pattern consisting of sectional loci separated with each other is recorded in practice, an undesirable frequency component corresponding to the repetition of the loci can be removed easily from sound signals reproduced on the base of such an optical pattern, because the frequency of the light beam deflection which causes such repeated loci is twice or more than the highest audible frequency. However, non-exposed residual parts of the optical pattern lowers an average density of the optical pattern, so that the signal level or the signal to noise ratio of the reproduced sound signal based on the optical pattern is lowered similarly. For reasons mentioned above, it is preferable to form the optical pattern in such a state that the sectional loci are disposed closely with each other. By the way, it is not so preferable to expose the film in the durations corresponding to the flyback of the light beam deflection also, so as to reduce the non-exposed residual parts. It is because the loci formed in the flyback durations are overlapped almost on those formed in so-called scanning durations, so that injured uniformity of density of the optical pattern causes the distortion of the reproduced sound signals.

In next to the above-mentioned basic configuration and principle of operation, respective blocks consisting in the basic configuration are explained particularly as follows.

Figure 3A:
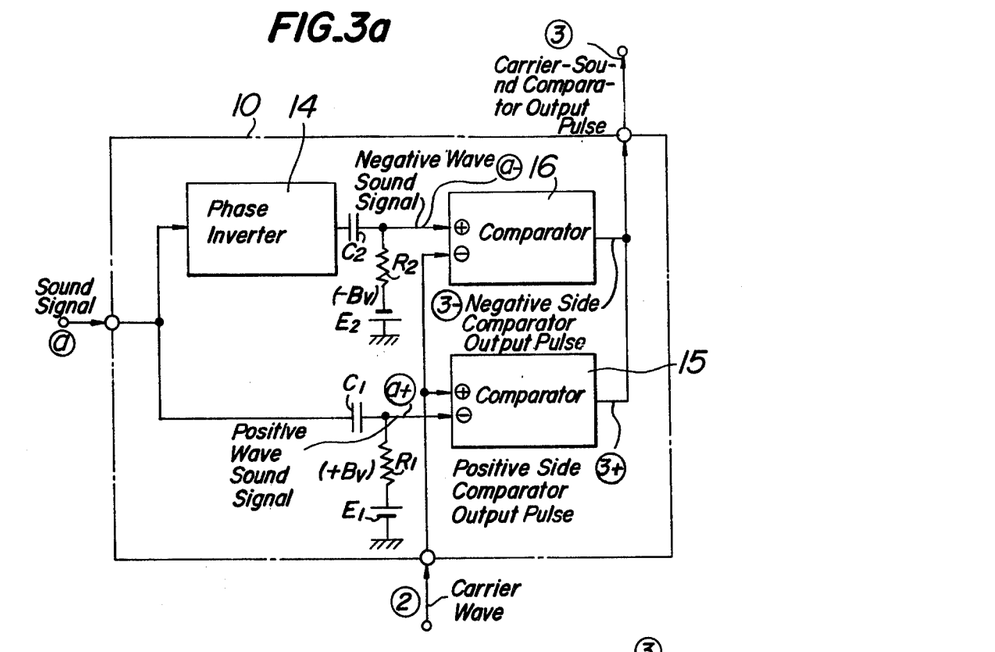
FIGS. 3(a) and (b) are block diagrams showing respectively preferred embodiments of a carrier-sound comparator consisting in the apparatus according to the present invention.

FIG. 3(a) shows an embodiment of the carrier-sound comparator surrounded by a chain line corresponding to the block 10 in the configuration shown in FIG. 1. In the embodiment shown in FIG. 3(a), the input sound signal is divided into two channels. AC components of the one channel filtered by a capacitor $C_1$ are applied to a plus input terminal ⊕ of the comparator 15, and AC components of the other channel inverted in polarity by a phase inverter 14 and filtered by a capacitor $C_2$ are applied to a plus input terminal ⊕ of a comparator 16. Besides, the plus input terminals ⊕ of the comparators 15 and 16 are supplied respectively with bias voltages +B and −B, which are derived respectively from voltage sources $E_1$ and $E_2$ through respective resistors $R_1$ and $R_2$, so that the comparator 15 is applied with the positive wave sound signal ⓐ+ shown in FIG. 2, and the comparator 16 is applied with the negative wave sound signal ⓐ− shown in FIG. 2. These sound signals ⓐ+ and ⓐ− are compared respectively in signal levels with the carrier wave ② for instance, of triangular wave form, applied to respective minus input terminals ⊖, so that positive pulses ③+ and ③− having pulse widths corresponding to respective durations wherein the signal level of the carrier wave ② is higher than that of the positive wave sound signal ⓐ+ and is lower than that of the negative wave sound signal ⓐ−. Positive side and negative side comparator output signals consisting respectively of these positive pulses ③+ and ③− are mixed non-additively with each other, so that an output pulse ③ can be derived from the carrier-sound comparator 10. The output pulse ③ consists of a pulse train as shown by the wave form ③ in FIG. 2, which has respective pulse widths corresponding to momentary amplitudes of the input sound signal ⓐ and pulse intervals corresponding to the frequency of the carrier wave ②.

Figure 3B:
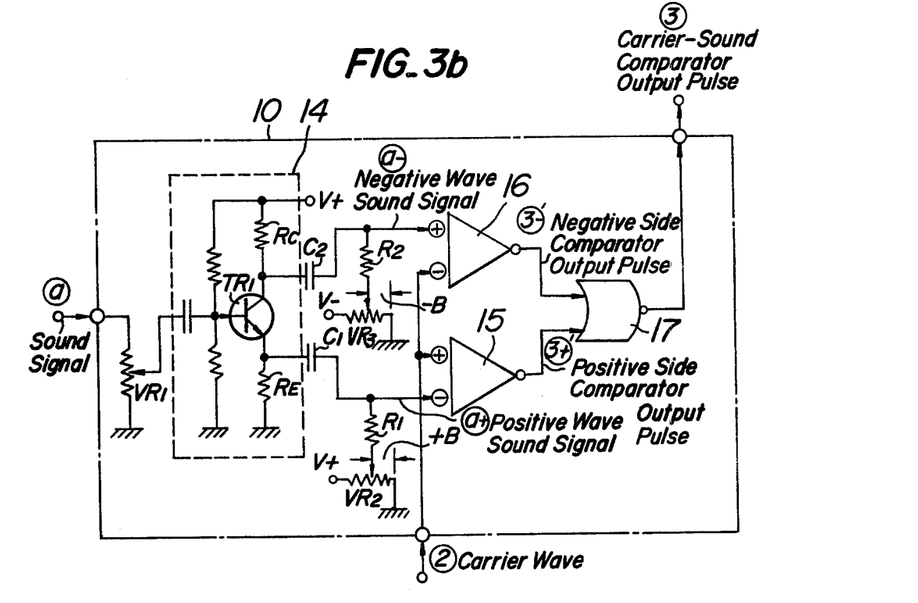

FIG. 3(b) shows more particularly the embodiment shown in FIG. 3(a). In the configuration shown in FIG. 3(b), the input sound signal ⓐ having an adequate signal level settled by a potentiometer $VR_1$ is applied to a phase inverter 14 consisting of a transistor $TR_1$, and then the two channel sound signals having the same amplitudes and the phases inverted with each other are derived respectively from load resistors RE and RC connected respectively to an emitter and a collector of the transistor $TR_1$. AC components of these two channel sound signals filtered respectively by the capacitors $C_1$ and $C_2$, and biased with respective bias voltage B+ and B− settled respectively by potentiometers $VR_2$ and $VR_3$, that is, the positive and negative wave sound signals ⓐ+ and ⓐ− shown in FIG. 2 are applied respectively to the comparators 15 and 16, and then are compared respectively in signal levels with the carrier wave ② similarly as mentioned above concerning FIG. 3(a). As for these comparators 15 and 16, digital comparators of conventional type, for instance, Type μA710 made by the Fairchild Co. can be used. However, in case the comparators 15 and 16 consist of such conventional ones and are applied with respective input signals to be compared similarly as shown in FIG. 3(a), polarities of the comparator output signals ③+ and ③− are inverted in comparison with shown in FIG. 3(a), that is, these comparator output signals ③+ and ③− consist of negative pulse trains ③+' and ③−'. Accordingly, it is required to invert again polarities of these negative pulse trains ③+' and ③−' and to mix them non-additively by a NOR gate 17 as shown in FIG. 3(b), so as to be able to obtain the same comparator output pulse ③ consisting of a positive pulse train as in FIG. 3(a). By the way, in case the respective input signals to be applied to the input terminals ⊕ and ⊖ of the comparators 15 and 16 are changed with each other in FIG. 3(b), it is obvious that the same output pulses as in FIG. 3(a) can be derived from the comparators 15 and 16 in FIG. 3(b).

On the other hand, it is possible to use well-known conventional devices for the light beam modulator 2 and the light beam deflector 3 consisting in the configuration shown in FIG. 1. For example, it is possible to use either an electro-optic device consisting of a crystal presenting electro-optic effect or an acoust-optic device, that is, a supersonic cell, wherein it is utilized to refract a light beam passing through a medium by means of applying supersonic waves to the medium, as the light beam modulator 2, and to use either said acoust-optic device or a galvanometer as the light beam deflector 3. Particularly, it is preferable to use said acoust-optic device as the light beam modulator 2 by virtue of high stability of black level and high contrast ratio performed on a film.

In the above description, the carrier wave ② used in the optical sound recording system according to the present invention is shown as a signal having triangular wave form in FIG. 2, flyback durations of which are not utilized at all for the operation. However, it is a matter of course that the wave form of the carrier wave is not restricted to the example mentioned above. Accordingly, the carrier wave having saw-tooth wave form or sinusoidal wave form can be used for modulating and deflecting the light beam, and the flyback durations of these wave forms can be used also, if necessary. It is preferable to modify the basic configuration shown in FIG. 1 in accordance with the modification of the carrier wave as mentioned above.

It is a matter of course also that, in case time or phase deviations between the gated light beam derived from the light beam modulator 2 and the deflected light beam derived from the light beam deflector 3 cannot be neglected, it is required to delay adequately the carrier wave ② applied to either one of the light beam modulator 2 and the light beam deflector 3.

Besides, in the above description, a negative film is used for the optical sound recording system, and accordingly the polarities of respective pulse trains derived from respective parts of the configuration shown in FIG. 1 are settled to be positive one. However, polarities of the film and of the pulse trains used in the optical sound recording system of the present invention are not at all restricted to the examples mentioned above also. In case a positive film is used for the recording system, it is required similarly as described above, to modify the basic configuration shown in FIG. 1 in such a manner that the polarities of respective pulse trains are inverted adequately by means of, for instances, inserting a phase inverter between the carrier-sound comparator 10 and the OR gate 11.

Figure 4A:
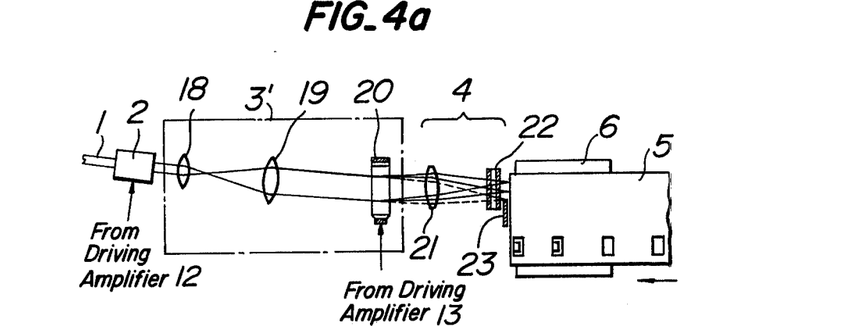
FIGS. 4(a) and (b) are a schematic plan and a schematic elevation showing respectively preferred embodiments of an optical system in case an acoust-optic deflector is used for the apparatus according to the present invention.
Figure 4B:
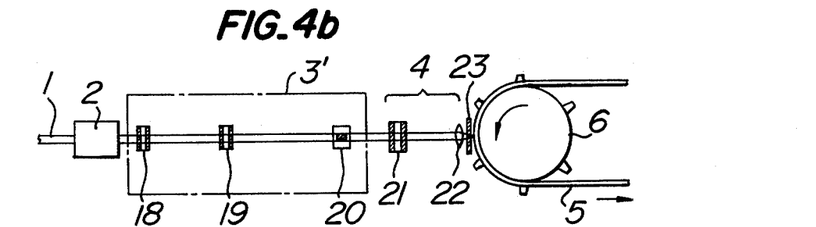
Figure 5:
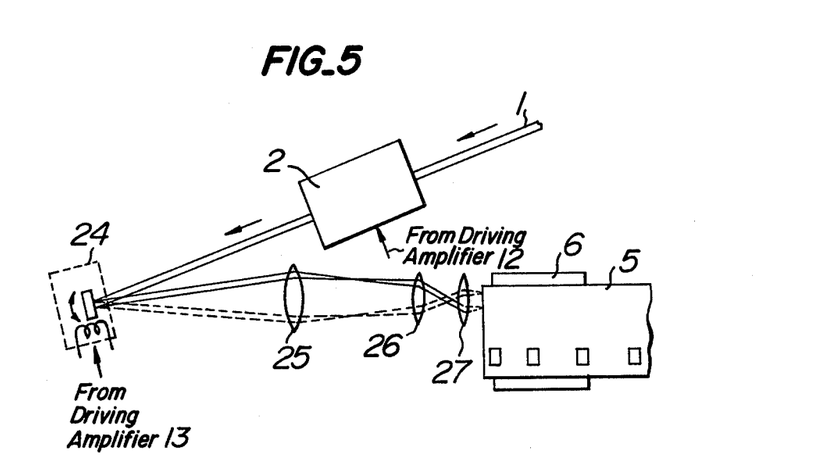
FIG. 5 is a schematic diagram showing a preferred embodiment of an optical system in case a galvanometer is used for a light beam deflector according to the present invention.

In the next place, preferred embodiments of the practical arrangement of optical systems according to the present invention are explained referring to FIGS. 4 and 5.

FIG. 4 shows an example of the optical system according to the present invention in case an acoust-optic device is used for the light beam modulator consisting in the configuration shown in FIG. 1. FIG. 4(a) is a plan view of the optical system mentioned above, which is shown in parallel with the deflecting direction of the light beam 1, and FIG. 4(b) is a side view of the same optical system which is shown in perpendicular to the direction mentioned above. In the optical system shown in these drawings, the light beam 1 consists of a laser beam having a wave length fitting the film recording, for instance, an argon ion laser beam having wave length of 5,145A filtered by a spectroprism, and the light beam modulator 2 consists of either one of the electro-optic device and the acoust-optic device as mentioned above. The light beam derived from the light beam modulator 2 is applied to a light beam deflector 3' shown with a chain line surrounding it in FIG. 4. This light beam deflector 3' consists of an supersonic cell 20, that is, acoust-optic one of several kinds of devices mentioned above, and besides of a first cylindrical lens 18 and a second cylindrical lens 19. An optical system consisting of lenses 18 and 19 enlarges a section of the input light beam in the deflecting direction only, so as to deform it into an elliptical one. It is because the larger the sectional size in the deflecting direction of the light beam injected into a following reduction optics 4 is, the smaller a sectional size in the same direction of a spot formed by the light beam derived from the reduction optics 4 and projected on a film 5 is, that is, the higher resolution of an optical pattern recorded on the film 5 by said light beam can be obtained. Such an elliptical light beam is applied to the acoust-optic device, that is, the supersonic cell 20, driven by a driving signal derived from the driving amplifier 13 mentioned earlier. The light beam derived from the acoust-optic deflector 20 is split into a zero degree refracted light beam and a first degree refracted light beam. Although these zero degree and first degree refracted light beams are passed together through the reduction optics 4 consisting of a third cylindrical lens 21 and a fourth cylindrical lens 22, the zero degree refracted light beam which is not at all deflected in the optical deflector 3 is shut by a shutter 23, and then only the first order refracted light beam which is deflected in response to the deriving signals can be projected on an emulsion layer deposited on the film 5. In the reduction optics 4, the third cylindrical lens 21 makes the input light beam focus in the deflecting direction as shown in FIG. 4(a), and the fourth cylindrical lens 22 makes it focus in a direction perpendicular to the deflecting direction as shown in FIG. 4(b), so that a circular or elliptical small light spot can be formed on the emulsion layer of the film 5. The film 5 is transported continuously at an uniform velocity by a film transporting mechanism 6, a sound track of which is exposed by the first degree refracted light beam shown with a real line deflected by the supersonic cell 20 at a high speed.

By the way, the conventional acoust-optic devices mentioned above are on the market as follows.

For the light beam deflector:

Acoust-Optic Deflector MODEL BD-100 made by Datalight Inc. (U.S.)

Acoust-Optic Deflector MODEL LD-400 made by ISOMET Inc. (U.S.)

Acoust-Optic Deflector MODEL-D-800 made by SORO Electro-Optics (France)

For the light beam modulator:

Acoust-Optic Modulator MODEL DLM-5 made by Datalight Inc. (U.S.)

Acoust-Optic Modulator MODEL 1201 made by ISOMET Inc. (U.S.)

Acoust-Optic Modulator MODEL M30 made by SORO Electro-Optics (France)

In case the acoust-optic device mentioned above is used for the light beam deflector 3', the light beam deflection of saw-tooth wave type can be effected by means of driving the acoust-optic deflector, which has ordinarily a high speed response characteristics, with the carrier wave ② consisting of a saw-tooth wave having, for instance, a repetition frequency of about 100 kHz. Furthermore, in case the deflected light beam consists of a laser beam having ordinarily a very high intensity, it is possible to raise the recording speed of the sound signal at about five times of that in the case of conventional sound recording on a film. For example, it can be expected that in case the optical sound recording is performed for transcribing sound signals recorded on a magnetic tape onto a sound track of a film, the speed of transcribing is raised higher than that in conventional case, and accordingly the working efficiency is improved remarkably.

In the next place, FIG. 5 shows an embodiment of the optical system according to the present invention wherein a galvanometer is used for the light beam deflector consisting in the configuration shown in FIG. 1. In this embodiment, a laser beam 1 similar as mentioned earlier is applied to a light beam modulator 2 driven by a light beam controlling pulse ⑤ derived from a driving amplifier 12, so that the laser beam is gated in response to the controlling pulse ⑤. The gated laser beam derived from the light beam modulator 2 is applied to a galvanometer 24. The conventional galvanometer 24 has ordinarily such a response characteristics as comprising a resonant frequency of about 25 kHz, so that the galvanometer can be driven by a carrier wave ② having a sinusoidal wave form of 25 kHz derived from a driving amplifier 13 as a driving signal. By the way, in case a driving signal of sinusoidal wave form is used for driving a light beam deflector, if central portions corresponding to about 40% of peak to peak length of the sinusoidal wave is used restrictedly for deflecting a light beam, almost linear deflection having distortion of only about 1% can be performed, so that sufficiently linear deflection of light beam can be effected in practice. The light beam deflected by the galvanometer 24 is applied to a reduction optics consisting of lenses 25, 26 and 27, and then is projected on an emulsion layer of a film 5, so as to obtain an optical pattern as shown by the pattern ⑥ in FIG. 2, which consists of loci of a fine spot of the projected light beam. The fine spot of the projected light beam can be formed as a beam waist caused by an optical system consisting of the lenses 26 and 27.

In the embodiment shown in FIG. 5, it is unavoidable that the frequency of the carrier wave used for driving the light beam modulator and deflector is lowered to about one fourth or less of that in the embodiment shown in FIG. 4, because the galvanometer, that is, the mechanical device, is used for deflecting the light beam, so that such a high speed of sound recording as mentioned above cannot be obtained. However, the embodiment shown in FIG. 5 has such advantages that an optical sound recording system having simple arrangement and low cost can be obtained, and besides, even if laser beams having various colours are used for optical sound recording on a multilayer colour film which needs to be exposed by a multicolour light, colour dispersion is not at all caused by the galvanometer used for deflecting such laser beams having various colours.

Furthermore, the light beam deflector consisting in the optical sound recording system according to the present invention is not restricted to several examples mentioned above. For instance, a conventional polygonal mirror rotating at a high speed can be substituted for the galvanometer consisting in the embodiment shown in FIG. 5. In such an arrangement as mentioned above, the carrier wave ② consists of a saw-tooth wave, with response to which the gating of the light beam is performed, and which drives the polygonal mirror so as to rotate synchronously.

Besides, in the above description, the light beam derived from the light beam deflector 3 is deflected linearly only in one direction. However, the manner of deflection of the light beam in the optical sound recording system according to the present invention is not at all restricted to the mentioned above, and accordingly it is a matter of course that various modifications can be performed. For instance, it is possible with the aid of an additional light beam deflecting means to wabble light beam deflected in one direction as mentioned above by an amount enough to remove non-exposed portions formed between sectional loci of the projected light beam as shown in the pattern ⑥ of FIG. 2, so as to increase a signal level and a signal to noise ratio of the reproduced sound signal.

It is evident from the above description, remarkable effects can be obtained in accordance with the present invention as follows. For instance, it is possible to expose a film with a minute light spot having extremely high intensity based on a laser beam used for optical sound recording in comparison with that in a conventional optical sound recording system, so that it is easy in the system according to the present invention to record sound signals optically on a monochrome or colour positive film having low sensitivity in a direct process, whilst it is difficult in a conventional recording system. In addition thereto, the positive film has extremely high resolvability based on supreme granularity in spite of low sensitivity. Accordingly, it can be realized in accordance with the present invention to record and reproduce optically a wide band sound signal having extremely excellent quality, although it is very difficult in a conventional system.

Furthermore, in the optical sound recording system of the present invention, the same carrier waves having the same wave form and the same phase are applied to a light beam modulator and a light beam deflector as respective driving signals, so that the characteristics of conversion in the light beam modulator wherein momentary amplitudes of a sound signal are converted into respective time durations of a gated light beam and the characteristics of converging in the light beam deflector wherein said respective time durations are converted into respective lengths of sectional loci of a deflected light beam have a relation of inverse function with each other. Consequently, even if the carrier wave mentioned above has non-linearity of wave form, the non-linearity does not at all harm an optical pattern of the recorded sound signal. In addition thereto, even if the density of the optical pattern of the recorded sound signal is varied partially because of variation of the deflecting speed of the light beam based on the non-linearity of the carrier wave driving the light beam deflector, the partial variation of the optical pattern can be limited into negligible amount in practice, because the laser beam having extremely high intensity is projected on a film having hard tone in the optical sound recording system of the present invention. So that, it is not at all required substantially to restrict the wave form of the carrier wave used for driving the light beam deflector into those mentioned earlier. Accordingly, it can be expected to realize an optical sound recording system wherein a driving signal having arbitrary wave form, for instance, sinusoidal wave form and others can be used for driving a light beam deflector, and a light beam modulator is driven with response to the deflection of light beam effected by the light beam deflector driven as mentioned above. For instance, it is possible that a part of the deflected light beam derived from the light beam deflector is split by a half mirror and is projected onto an array of opto-electric converting minute elements alike to that consisting in a so-called solid state television camera, which is used for detecting momentary timings of deflection of the light beam, and then a carrier wave formed in response to the detected momentary timings is used for driving the light beam modulator similarly as mentioned earlier, so that the relation mentioned above between respective conversions in the light beam modulator and the light beam deflector can be improved better than that mentioned earlier.

In the optical sound recording system according to the present invention, it can be realized to perform an extremely high velocity light beam deflection based on the usage of an acoust-optic device utilizing a supersonic wave, so that sound recording can be performed at a high speed of several times of that in a conventional system, and accordingly the working efficiency can be improved as mentioned above, and besides it is realized easily to use the system of the present invention for recording a sound signal optically on both of positive and negative films by means of changing the polarity of light beam modulation in response to that of the film.

Furthermore, in the optical sound recording system of the present invention, wherein the optical sound recording of variable area type is performed with a minute deflected light spot having constantly high intensity, an optical pattern having extremely uniform density and sharp edge can be obtained, so that a sound signal having excellent quality, that is, very little distortions of the optical pattern based on operating conditions of developing the film, especially in a higher frequency range wherein high resolvability of the optical pattern is required, can be recorded and reproduced, and besides photographic procedures, that is, developing and printing of the recorded film according to the present invention can be extremely simplified and stabilized.

What is claimed is:

1. An optical sound recording system, wherein a light beam gated in intermittent durations corresponding to momentary amplitudes of a sound signal at a high frequency beyond audible range is deflected in a direction crossing a transporting direction of a film transported continuously at said high frequency and is recorded on said film, comprising
    (1) a sound signal source,
    (2) a carrier wave signal source,
    (3) a deflection signal source for providing a deflection signal,
    a light source provided for generating said light beam,
    a first optical means provided for gating said light beam periodically,
    a second optical means provided for deflecting said light beam gated by said first optical means in said direction and at said high frequency under control of said deflection signal,
    a third optical means provided for reducing size of a light spot formed by said light beam gated by said first optical means and deflected by said second optical means in response to a width of a sound track formed on said film and for projecting said reduced light spot on said sound track,
    means coupled to said sound signal source for providing a pair of sound signals polarized oppositely to each other and respectively biased positively and negatively,
    a pair of comparators provided for comparing respectively sound signals of said pair with said carrier wave having the same frequency, phase and wave form to that of the deflection of said light beam, and
    an amplifier provided for amplifying and applying output signals derived from said pair of comparators to said first optical means as driving signals.

2. An optical sound recording system as claimed in claim 1, wherein said light source consists of a laser beam source.

3. An optical sound recording system as claimed in claim 1, wherein said pair of comparators form respectively pulses polarized for blanking said light beam and having pulse durations corresponding to respective parts of said carrier wave extending beyond said positively biased sound signal and below said negatively biased sound signal.

4. An optical sound recording system as claimed in claim 3, wherein said pulses formed by said pair of comparators are mixed non-additively with blanking pulses corresponding to flyback of the deflection of said light beam.

5. An optical sound recording system as claimed in claim 1, wherein the deflection of said light beam is effected in a manner corresponding to anyone of the following: a triangular wave, a saw-tooth wave or a sinusoidal wave.

6. An optical recording system as claimed in claim 5, wherein said second optical means consists of an acoust-optic device.

7. An optical sound recording system as claimed in claim 5, wherein said second optical means consists of a galvanometer driven by a driving signal having sinusoidal wave form.

8. An optical sound recording system as claimed in claim 5, wherein said second optical means consists of a rotating polygonal mirror synchronized with a driving signal having a saw-tooth wave form.

9. An optical sound recording system as claimed in claim 1, wherein said first optical means consists of either an electro-optic device or an acoust-optic device.

10. An optical sound recording system, wherein a light beam gated in intermittent durations corresponding to momentary amplitudes of a sound signal at a high frequency beyond audible range is deflected in a direction crossing a transporting direction of a film transported continuously and is recorded on said film, comprising
    a sound signal source,
    a light source provided for generating said light beam,
    a first optical means provided for gating said light beam periodically,
    said high second optical means provided for deflecting said light beam gated by said first optical means in said direction and at said frequency,
    a third optical means provided for reducing size of a light spot formed by said light beam gated by said first optical means and deflected by said second optical means in response to width of a sound track formed on said film and for projecting said reduced light spot on said sound track,
    a pulse generator provided for generating a pulse train having said high frequency,
    a carrier wave generator provided for generating a carrier wave synchronized with said pulse train derived from said pulse generator and used for driving said first and second optical means,
    means coupled to said sound signal source for providing a pair of sound signals polarized oppositely to each other and respectively biased positively and negatively, a pair of comparators provided for comparing respectively sound signals of said pair with said carrier wave derived from said carrier wave generator, a first amplifier provided for amplifying and applying output signals derived from said pair of comparators to said first optical means as driving signals, and a second amplifier provided for amplifying and applying said carrier wave derived from said carrier wave generator to said second optical means as a driving signal.

11. An optical sound recording system as claimed in claim 10, wherein said light source consists of a laser beam source.

12. An optical sound recording system as claimed in claim 10, wherein said pair of comparators form respectively pulses polarized for blanking said light beam and having pulse durations corresponding to respective parts of said carrier wave extending beyond said positively biased sound signal and below said negatively biased sound signal.

13. An optical sound recording system as claimed in claim 12, wherein said pulses formed by said pair of comparators are mixed non-additively with blanking pulses corresponding to flyback of the deflection of said light beam.

14. An optical sound recording system as claimed in claim 10, wherein the deflection of said light beam is effected in a manner corresponding to anyone of the following: a triangular wave, a saw-tooth wave or a sinusoidal wave.

15. An optical sound recording system as claimed in claim 10, wherein said first optical means consists of either an electro-optic device or an acoust-optic device.

16. An optical recording system as claim in claim 10, wherein said second optical means consists of an acoust-optic device.

17. An optical sound recording system as claimed in claim 10, wherein said first and second optical means consist respectively of acoust-optic devices and are driven respectively by said carrier wave having either a triangular or a saw-tooth wave form.

* * * * *

UNITED STATES PATENT AND TRADEMARK OFFICE
CERTIFICATE OF CORRECTION

PATENT NO. : 4,087,651
DATED : May 2, 1978
INVENTOR(S) : Teiichi TANEDA et al

It is certified that error appears in the above-identified patent and that said Letters Patent is hereby corrected as shown below:

In Column 12, line 52, please change "said high" to
-- a --.

Signed and Sealed this

Thirtieth Day of July 1985

[SEAL]

Attest:

DONALD J. QUIGG

Attesting Officer     Acting Commissioner of Patents and Trademarks